Dec. 18, 1945.   C. A. PUGH   2,391,072
HYDRAULIC PUMP
Original Filed May 17, 1943
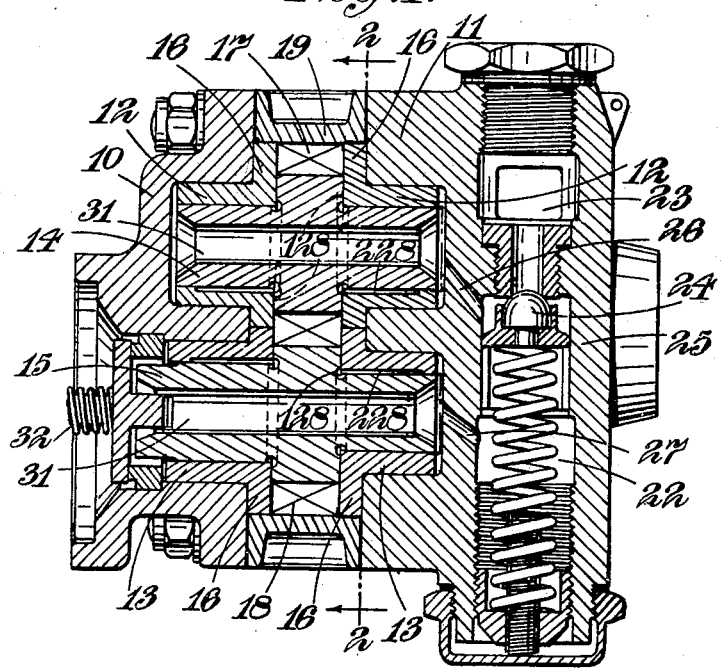
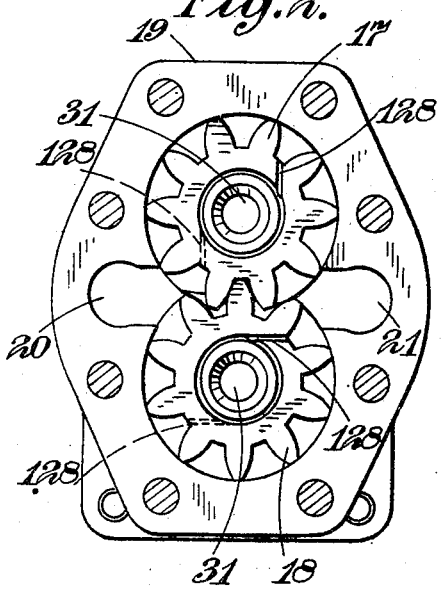
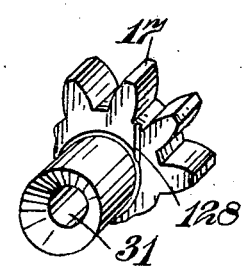
CYRIL A. PUGH
INVENTOR
by his attorneys
Stebbins, Blenko & Webb Patented Dec. 18, 1945

2,391,072

UNITED STATES PATENT OFFICE 2,391,072

HYDRAULIC PUMP

Cyril Alphonso Pugh, Ilford, England, assignor to The Plessey Company Limited, Ilford, England, a British company Original application May 17, 1943, Serial No. 487,252. Divided and this application June 21, 1944, Serial No. 541,398. In Great Britain July 10, 1942.

1 Claim. (Cl. 103—126)

This application is a divisional of my co-pending United States application Serial No. 487,252, filed May 17, 1943, for "Hydraulic pumps."

This invention consists in improvements in or relating to hydraulic pumps of the gear type having internal self-lubrication and has for its object to improve the means by which hitherto this self-lubrication has been afforded.

According to the present invention a hydraulic gear pump comprises in combination a casing consisting of a centre section and two outer sections whereof the centre section is formed as a pump chamber provided with inlet and outlet ports and the outer sections are provided with journal bearings, and a pair of intermeshing pump gears rotatably mounted in the pump chamber of the said casing, each of said gears having angularly displaced channels provided on its opposite cheeks, each said channel opening at one end to the pump chamber and at the other end to one of the journal bearings whereby the ends of the channels will be brought periodically and successively into communication with the outlet from the pump chamber thereby to receive small quantities of fluid on each occasion, which quantities of fluid are forced into the channels to provide pressure pulsations acting alternately on opposite faces of the gears and in addition will pass to the journal bearings to effect lubrication thereof.

Thus, the liquid in conjunction with which the pump is operating is enabled not only to provide internal lubrication for the pump bearings, but also by the position in which the ducts are situated will provide pressure pulsations occurring alternately on opposite faces of the gears which assists in efficient lubrication.

In order that the invention may be more clearly understood a preferred embodiment of the invention will now be described in which—

Figure 1 is a central section through the pump in a plane containing the axes of the pump gears;

Figure 2 is a section on the line 2—2 of Figure 1, and

Figure 3 is a perspective view of a portion of one of the gears.

Like reference numerals indicate like parts in all the figures of the drawing.

In the example illustrated each end section 10 and 11 is provided with journal bearings 12 and 13 for the pump spindles 14 and 15 and these bearings are provided with flanges 16 overlying the inner surfaces of the end sections, the flanges being made of exactly the same diameter as the gears 17 and 18 carried respectively by spindles 14 and 15. The centre section 19 is chambered to fit tightly over the journal flanges 16 and thus in conjunction therewith to provide working chambers for the gears. Laterally on each side of the line of intersection of the gears the centre section is formed with inlet and outlet ports 20 and 21 respectively one on one side and the other on the other side respectively and these ports communicate with similar ports extending, though not shown, through end section 11 in directions parallel with the axes of the gears. These two ports open at 22 and 23 respectively with opposite sides of a spring-controlled pressure relief valve 24, the valve chamber 25 of which is accommodated within this end section. Other ducts 26 and 27, also within end section 11 and leading from the bottoms of the recesses in which the journals are received, are ported into the relief valve casing on the low pressure side of valve 24.

Lubricating ducts 128 will be formed as shallow channels cut into opposite walls of the cheeks of the gears, one duct in each wall of each gear. These ducts are disposed tangentially and in each they are arranged 180° apart and the gears are so assembled that as between one gear and the other the ducts are only 90° apart. Thus as the gears rotate, the ducts will come successively into communication with the outlet or pressure conduit and in consequence small quantities of fluid will on each occasion be forced through the ducts into the journal bearings. Moreover, if, in each gear, ducts 128 are provided one in each side face of the gear and these ducts are spaced 180° out of phase, pressure pulsations will occur acting alternately on the opposite gear faces and will tend to assist in centralising the gears within the casing.

As the gear spindles are hollow by reason of axial passages 31 formed through them, the liquid passing over the bearing surfaces at one end (i. e. the left-hand side in Figure 1) will be forced through the hollow spindles towards the conduits 26 and 27 in the opposite end section 11 which communicate with the low pressure side of the relief valve, whereas liquid entering the ducts in the other journals and travelling axially through them will pass directly to those conduits, thus affording an efficient liquid circulation, over the surfaces to be lubricated, of that portion of the pressure liquid that is required for this purpose.

A pump of the nature of the type described has been found to be efficiently self-lubricating when used for pumping liquids of very low viscosity such as petrol or paraffin; but although the invention is designed primarily for this purpose, it is not limited to this use as it may be employed for dealing with any hydraulic fluids which of their own nature can serve to lubricate the running parts of the pump.

I claim:

A hydraulic gear pump comprising in combination a casing consisting of a centre section and two outer sections, whereof the said centre section is formed as a pump chamber provided with inlet and outlet ports and the outer sections are provided with journal bearings, a pair of intermeshing pump gears rotatably mounted in the pump chamber of the said casing, each of said gears having at least one channel provided on each of its opposite cheeks with the channel in one cheek angularly displaced relatively to that in the other cheek, and each such channel opening substantially throughout its length in the face of the said cheek and opening also at one end to the pump chamber and at the other end to one of the journal bearings, whereby the ends of the channels will be brought periodically and successively into communication with the outlet from the pump chamber thereby to receive successive small quantities of fluid as the gears rotate, which quantities of fluid are forced into the channels to provide pressure pulsations acting alternately on opposite faces of the gears, and in addition will pass to the journal bearings to effect lubrication thereof.

CYRIL ALPHONSO PUGH.